United States Patent [19]

Albanese et al.

[11] 4,039,309
[45] Aug. 2, 1977

[54] METHOD AND APPARATUS FOR BREAKING OPTICAL FIBERS

[75] Inventors: Andres Albanese, Matawan; Louis Maggi, Holmdel, both of N.J.

[73] Assignee: Bell Telephone Laboratories, Incorporated, Murray Hill, N.J.

[21] Appl. No.: 709,307

[22] Filed: July 28, 1976

[51] Int. Cl.² .............................................. C03B 33/06
[52] U.S. Cl. .......................................... 65/2; 65/11 R; 65/112; 65/175; 65/DIG. 7
[58] Field of Search .................... 65/2, 11 R, 112, 113, 65/DIG. 7, 175, 4 B

[56] References Cited
U.S. PATENT DOCUMENTS 3,880,637   4/1975   Dichter ................................. 65/113

OTHER PUBLICATIONS

The Bell System Technical Journal, Dec. 1971, "Optical Fiber Joining Technique," pp. 3153–3154.
The Bell System Technical Journal, Nov. 1973, "Optical Fiber End Preparation for Low-Loss Splices," pp. 1582–1584.

Primary Examiner—Arthur D. Kellogg
Attorney, Agent, or Firm—Erwin W. Pfeifle

[57] ABSTRACT

The present invention relates to a method and apparatus for breaking optical fibers. The present method comprises the steps of: clamping an optical fiber at two spaced-apart peripheral areas on opposite sides of the area of intended break; heating the area of the intended break to at least the annealing temperature of the fiber; scoring the fiber along the line of intended break; and either bending and pulling or pulling the fiber apart to produce a break with a flat end surface. The heating step may also be advantageously employed to melt or evaporate a jacket surrounding the optical fiber adjacent to the area of intended break.

9 Claims, 2 Drawing Figures

4,039,309

METHOD AND APPARATUS FOR BREAKING OPTICAL FIBERS

BACKGROUND OF THE INVENTION

1. Field of the Invention

The present invention relates to method and apparatus for breaking optical fibers and, more particularly, to method and apparatus especially for breaking optical fibers which include large cores having varying boundary layer stresses therein.

2. Description of the Prior Art

A desirable condition in breaking an optical fiber is the production of a flat end surface. Such a flat end surface is essential to the fabrication of a low loss splice.

The article "Optical Fiber Joining Technique" by D. L. Bisbee in the *Bell System Technical Journal,* Vol. 50, No. 10, dated December 1971, at pages 3153-3154, describes a method for breaking optical fibers comprising the following sequential steps: laying a fiber across a sharp metallic edge; positioning a Tesla coil so that its discharge is concentrated at the point where the fiber touches the metal to score the fiber; and breaking the fiber by pulling or bending it.

Another technique is disclosed in the article "Optical Fiber End Preparation for Low-Loss Splices" by D. Gloge, P. W. Smith, D. L. Bisbee, and E. L. Chinnock in the *Bell System Technical Journal,* Vol. 52, No. 9, dated November 1973, at pages 1582-1584. There, a fiber is clamped, the free end thereof is draped over a bridge-like structure in the area of the intended break, and the free end is attached to a gauge to monitor the level of the applied tension. When the fiber is scored in the area of the bridge-like structure, the applied tension causes the fiber to break.

Prior art methods, however, were found not to be adaptable for consistently producing flat ends when breaking large diameter Sodium Germanium-doped or similar type fibers, because such fibers include large cores having varying boundary layer stresses therein which are introduced by the fiber manufacturing techniques used. The problem, therefore, remaining is to provide a method for breaking optical fibers including large cores having varying boundary layer stresses therein.

BRIEF SUMMARY OF THE INVENTION

The present invention relates to method and apparatus for breaking optical fibers and, more particularly, to method and apparatus especially for breaking optical fibers which include large cores having varying boundary layer stresses therein.

The present invention further relates to method and apparatus for breaking an optical fiber by heating an optical fiber to at least its annealing temperature, scoring the optical fiber, and either bending and pulling or pulling said fiber to cause it to break. It is another aspect of the present invention to utilize the heating step to evaporate or melt the jacket adjacent to the area of intended break of the optical fiber.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
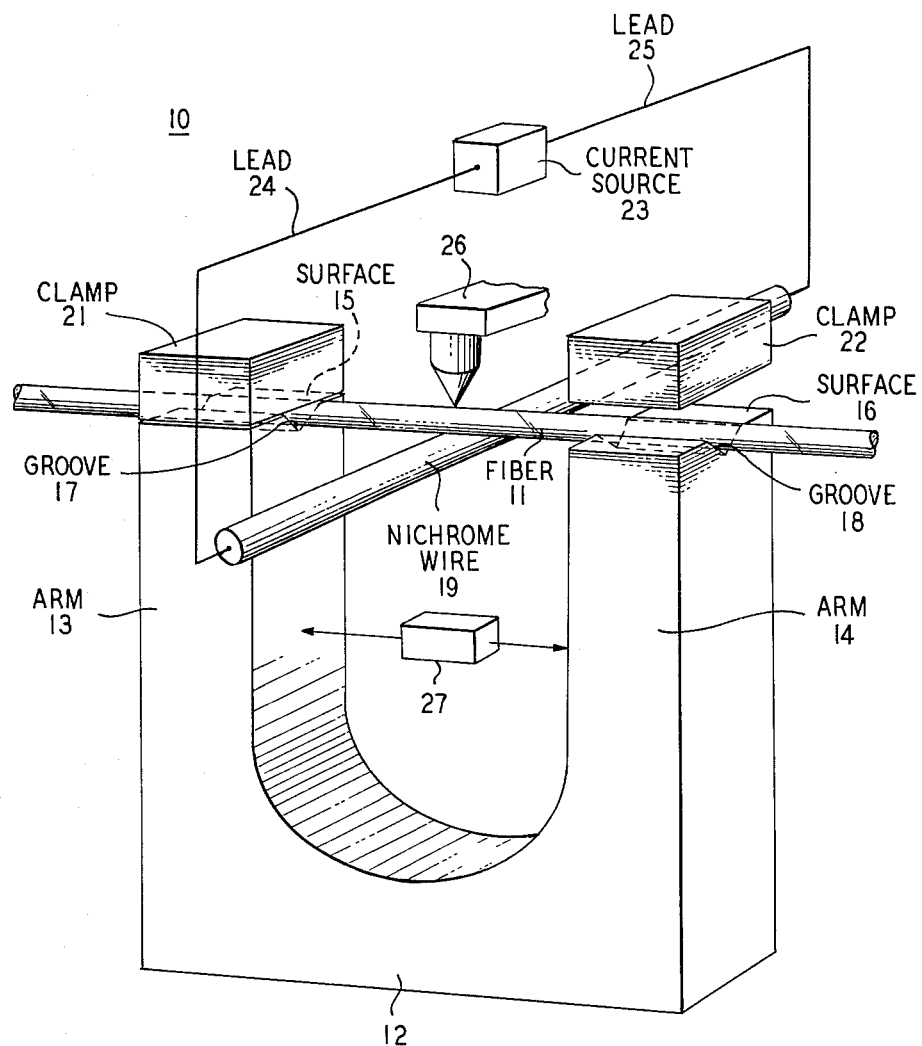
FIG. 1 is a view in perspective of the optical fiber breaking tool according to the present invention.

In FIG. 1 there is shown an apparatus for breaking optical fibers, designated by the numeral 10, in accordance with the present invention.

Apparatus 10, for breaking an optical fiber 11, is shown as comprising a yoke 12 connecting a first and a second aligning arm designated 13 and 14, first arm 13 comprising an end 15 and second arm 14 comprising an end 16 lying in a mutual horizontal plane. A first V-groove 17 is formed in the end 15 of first arm 13 and a second V-groove 18 is formed in end 16 of second arm 14 such that V-grooves 17 and 18 are axially aligned for aligning optical fiber 11 in apparatus 10. A nichrome wire 19 is disposed in contact with a portion of the peripheral surface of optical fiber 11 normal to and below the longitudinal axis of optical fiber 11 in the area between arms 13 and 14. Wire 19 may be raised to cause a bend in the area of intended break of fiber 11. A first and a second clamp 21 and 22 are disposed above first and second ends 15 and 16 of first and second arms 13 and 14, respectively, to engage and secure fiber 11 in V-grooves 17 and 18. A current source 23 is connected to nichrome wire 19 by leads 24 and 25. Current source 23 includes a switch (not shown) for energizing the current source and a means (not shown) for controlling the magnitude of the current flowing through nichrome wire 19 and, in turn, the temperature of wire 19. A scoring tool 26 is disposed above the intersection of fiber 11 and nichrome wire 19 for movement parallel to the longitudinal axis of nichrome wire 19. A means 27 capable of separating aligning arms 13 and 14 when activated is disposed in contact with each of arms 13 and 14.

In operation, optical fiber 11 is placed in aligning grooves 17 and 18 with the area of intended break in contact with nichrome wire 19. Two clamps 21 and 22 secure fiber 11 in aligning grooves 17 and 18. Current source 23 is energized and the included control means (not shown) is adjusted to pass a current through nichrome wire 19 to heat wire 19 and in turn, to heat optical fiber 11 to at least its annealing temperature. By heating fiber 11 to at least its annealing temperature, both the internal stresses are reduced therein and a thermal gradient is produced within fiber 11 along the line intended break. Scoring tool 26 is pulled across fiber 11 in a direction parallel and directly above the longitudinal axis of nichrome wire 19 scoring fiber 11 at the line of intended break. Where fiber 11 has a small diameter such as, for example, a diameter less than 70 microns, the thermal gradient produced in fiber 11 by the heat from nichrome wire 19 will permit fiber 11 to be broken by the introduction of a pulling force along the longitudinal axis of fiber 11 in a direction away from the line of the intended break without bending the fiber. However, when fiber 11 has a large diameter such as, for example, a diameter above 70 microns, the thermal gradient produced by the heat from nichrome wire 19 is insufficient to produce a flat end by merely applying the above mentioned pulling force and a bending force is required in addition thereto. The bending force can be produced by raising nichrome wire 19 by a very small amount to create a bend in fiber 11 prior to, or concurrent with the heating of nichrome wire 19. The force mechanism 27 placed between arms 13 and 14 parallel to the longitudinal axis of fiber 11 is activated to separate arms 12 and 13 and to apply a pulling force along the longitudinal axis of fiber 11 in a direction away from the line of the intended break. The applied pulling and bending or pulling force causes a small crack, originated by the scoring operation, to propagate along the thermal gradient produced by the hot nichrome wire 19 to produce a clean flat break end surface along the line of intended break.

Figure 2:
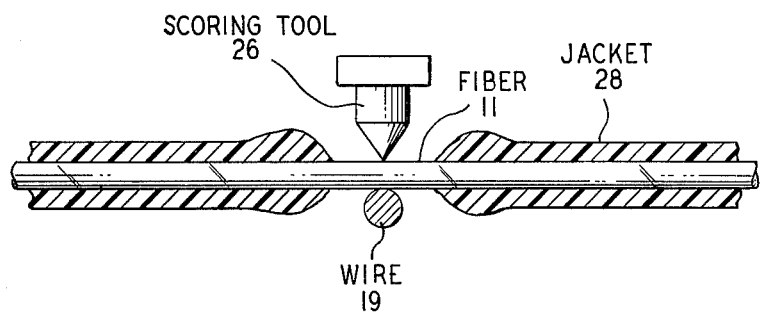
FIG. 2 is a view in front elevation of a portion of the optical fiber breaking tool of FIG. 1 showing the scoring tool and wire heating element in contact with the optical fiber after removal of an optical fiber protective jacket adjacent the area of the intended break.

Nichrome wire 19 may also be advantageously employed to melt or evaporate a protective jacket 28 surrounding optical fiber 11 in the manner shown in FIG. 2. In this case nichrome wire 19 is heated to at least the melting temperature of jacket 28. At this temperature jacket 28 may either melt or evaporate depending on the nature of the constituents thereof. In melting, the liquid jacket material flows along the peripheral surface of optical fiber 11 away from hot nichrome wire 19 leaving a section of optical fiber 11 exposed.

It is to be understood that the above-described apparatus for breaking optical fibers is exemplary only, and is for the purpose of exposition and not for purposes of limitation. For example, it will be readily appreciated that the scoring tool 26 can comprise any suitable configuration for scoring an optical fiber 11 including, for example, a diamond knife, a file, or any device capable of scoring an optical fiber. Additionally, the means for heating the optical fiber can comprise any suitable configuration, such as, for example, a hot razor edge in contact with the fiber or any means for heating the optical fiber to its annealing temperature in a manner as to cause a thermal gradient to be produced within the fiber along the line of the intended break.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A method of breaking an optical fiber comprising the steps of:
   a. clamping the optical fiber at two spaced-apart peripheral areas on opposite sides of the intended break;
   b. heating the optical fiber in the area of the intended break to at least the annealing temperature of the fiber and in a manner to cause a thermal gradient to be produced within said fiber along the line of the intended break;
   c. scoring the optical fiber on the line of the intended break; and
   d. applying a force along the longitudinal axis of the optical fiber at each said two spaced-apart peripheral areas in a manner to cause the fiber to break.

2. The method according to claim 1 wherein:
   e. in performing step (d), applying a pulling force in a direction away from the line of intended break to cause the fiber to break.

3. The method according to claim 1 wherein:
   f. in performing step (d), applying a bending force to said fiber in the area of the intended break concurrent with applying a pulling force in a direction away from the line of intended break to cause the fiber to break.

4. The method according to claim 1 wherein the optical fiber includes a protective jacket surrounding the optical fiber, comprising the additional step of:
   g. after step (a), heating the protective jacket in the area of the intended break to at least the melting temperature of the jacket.

5. Apparatus for breaking an optical fiber comprising:
   means for clamping the optical fiber at two spaced-apart peripheral areas on opposite sides of a line of intended break;
   means in contact with a portion of the peripheral surface of the optical fiber for heating the optical fiber along the line of intended break to at least the annealing temperature of the optical fiber and in a manner to cause a thermal gradient to be produced within said fiber along said line of intended break;
   means for scoring the optical fiber along a portion of line of intended break; and
   means for applying a force along the longitudinal axis of the optical fiber in a manner to break the fiber.

6. The apparatus according to claim 5 wherein:
   said means for heating comprises a heating element in point contact with the peripheral surface of said optical fiber along the line of intended break.

7. The apparatus according to claim 5 wherein said force applying means is capable of:
   applying a pulling force in a direction away from the line of intended break to cause the fiber to break.

8. The apparatus according to claim 5 wherein said force applying means is capable of:
   applying a bending force to said fiber in the area of the intended break concurrent with applying a pulling force in a direction away from the line of intended break to cause the fiber to break.

9. The apparatus according to claim 5 wherein the optical fiber includes a protective jacket surrounding the optical fiber, wherein:
   the means for heating the optical fiber is placed in contact with the protective jacket to heat the protective jacket to the melting.

* * * * *

UNITED STATES PATENT AND TRADEMARK OFFICE
CERTIFICATE OF CORRECTION

PATENT NO. : 4,039,309

DATED : August 2, 1977

INVENTOR(S) : Andres Albanese and Louis Maggi

It is certified that error appears in the above–identified patent and that said Letters Patent are hereby corrected as shown below:

Column 2, line 53 after "line" insert --of--. Column 4, line 55 after "melting" insert --temperature thereof--.

Signed and Sealed this

First Day of November 1977

[SEAL]

Attest:

RUTH C. MASON
*Attesting Officer*

LUTRELLE F. PARKER
*Acting Commissioner of Patents and Trademarks*